(12) United States Patent
Macgillivray et al.

(10) Patent No.: US 12,325,838 B2
(45) Date of Patent: Jun. 10, 2025

(54) POLYUNSATURATED FATTY ACID CONTAINING FOOD INGREDIENT WITH ENHANCED PALATABILITY AND METHOD FOR MANUFACTURING THE SAME

(71) Applicants: DSM IP Assets B.V., Heerlen (NL); Evonik Operations GmbH, Essen (DE)

(72) Inventors: Tanya Frances Macgillivray, Nova Scotia (CA); Jennifer Yvonne May, Nova Scotia (CA); Michael L. Stefanski, Winchester, KY (US); Nasrin Tabayehnejad, Lexington, KY (US); Jonathan Wesley Wilson, Blacksburg, VA (US); Stephanie Lanoue Kassner, Columbia, MD (US)

(73) Assignees: DSM IP ASSETS B.V., Heerlen (NL); EVONIK OPERATIONS GMBH, Essen (DE)

( * ) Notice: Subject to any disclaimer, the term of this patent is extended or adjusted under 35 U.S.C. 154(b) by 708 days.

(21) Appl. No.: 17/413,169

(22) PCT Filed: Dec. 13, 2019

(86) PCT No.: PCT/US2019/066265
§ 371 (c)(1),
(2) Date: Jun. 11, 2021

(87) PCT Pub. No.: WO2020/123965
PCT Pub. Date: Jun. 18, 2020

(65) Prior Publication Data
US 2022/0049182 A1     Feb. 17, 2022

Related U.S. Application Data

(60) Provisional application No. 62/779,660, filed on Dec. 14, 2018.

(51) Int. Cl.
| | | |
|---|---|---|
| C11B 3/14 | (2006.01) |
| A23D 9/04 | (2006.01) |
| A23K 20/158 | (2016.01) |
| A23K 50/40 | (2016.01) |
| A23L 5/20 | (2016.01) |
| A23L 33/115 | (2016.01) |
| B01D 1/08 | (2006.01) |

(52) U.S. Cl.
CPC ............... *C11B 3/14* (2013.01); *A23D 9/04* (2013.01); *A23K 20/158* (2016.05); *A23K 50/40* (2016.05);
(Continued)

(58) Field of Classification Search
CPC ......... C11B 3/14; A23K 20/158; A23K 50/40; A23L 5/20; A23L 33/115; A23D 9/04; B01D 1/08; A23V 2002/00
(Continued)

(56) References Cited

U.S. PATENT DOCUMENTS 4,093,540 A * 6/1978 Sen Gupta ............... A23J 7/00
426/417
10,041,097 B2  8/2018 Schaap et al.
(Continued)

FOREIGN PATENT DOCUMENTS

| CN | 101232802 | 7/2008 |
| CN | 101252844 | 8/2008 |

(Continued)

OTHER PUBLICATIONS

Lin et al, "*Efficiency of Removing Volatiles from Menhaden Oils by Refining, Bleaching, and Deodorization*", Journal of Food Science, vol. 55, No. 6, pp. 1669-1672 (1990).
(Continued)

*Primary Examiner* — Brent T O'Hern
(74) *Attorney, Agent, or Firm* — Nixon & Vanderhye P.C.

(57) ABSTRACT

Disclosed herein is a refined PUFA oil with an enhanced palatability comparing to the same PUFA oil without refine-
(Continued)

ment. Also disclosed is a food composition for a companion animal or a food for human consumption wherein said food composition comprises the above refined PUFA oil and thus having enhanced palatability. Further disclosed herein is a method for manufacturing the above-mentioned refined PUFA oil wherein said method comprises the step of deodorization.

14 Claims, 1 Drawing Sheet

(52) U.S. Cl.
CPC ............... *A23L 5/20* (2016.08); *A23L 33/115* (2016.08); *B01D 1/08* (2013.01); *A23V 2002/00* (2013.01)

(58) Field of Classification Search
USPC ........................................................ 426/601
See application file for complete search history.

(56) References Cited

U.S. PATENT DOCUMENTS

| 2007/0003686 | A1* | 1/2007 | Fichtali | ................... | A23D 7/04 |
| | | | | | 426/601 |
| 2008/0280274 | A1 | 11/2008 | Friesen et al. | | |
| 2009/0306419 | A1* | 12/2009 | Myong | ................... | C11B 3/001 |
| | | | | | 554/204 |
| 2010/0173061 | A1 | 7/2010 | Wilkes | | |

FOREIGN PATENT DOCUMENTS

| CN | 108208685 | | 6/2018 | | |
| CN | 104883892 | | 2/2020 | | |
| JP | H07292385 | A | 11/1995 | | |
| KR | 20060126524 | | 12/2006 | | |
| KR | 20100016389 | | 2/2010 | | |
| WO | WO 2004/022678 | | 3/2004 | | |
| WO | WO 2005/063999 | | 7/2005 | | |
| WO | WO 2008/138575 | | 11/2008 | | |
| WO | WO-2017035403 | A1 * | 3/2017 | ............... | A23C 9/00 |
| WO | WO 2018/156596 | | 8/2018 | | |

OTHER PUBLICATIONS

Srikaeo, Khongsak et al, Simple Techniques to Increase the Production Yield and Enhance the Quality of Organic Rice Bran Oils, *Journal of Oleo Science* 60, (1), 1-5 (2011).
Edible Oils and Fats Refining, Gianazza International, https://www.gianazzainternational.com/wp-content/uploads/2020/05/Edible-Oils-and-Fats-Technology.pdf, 2020.

\* cited by examiner

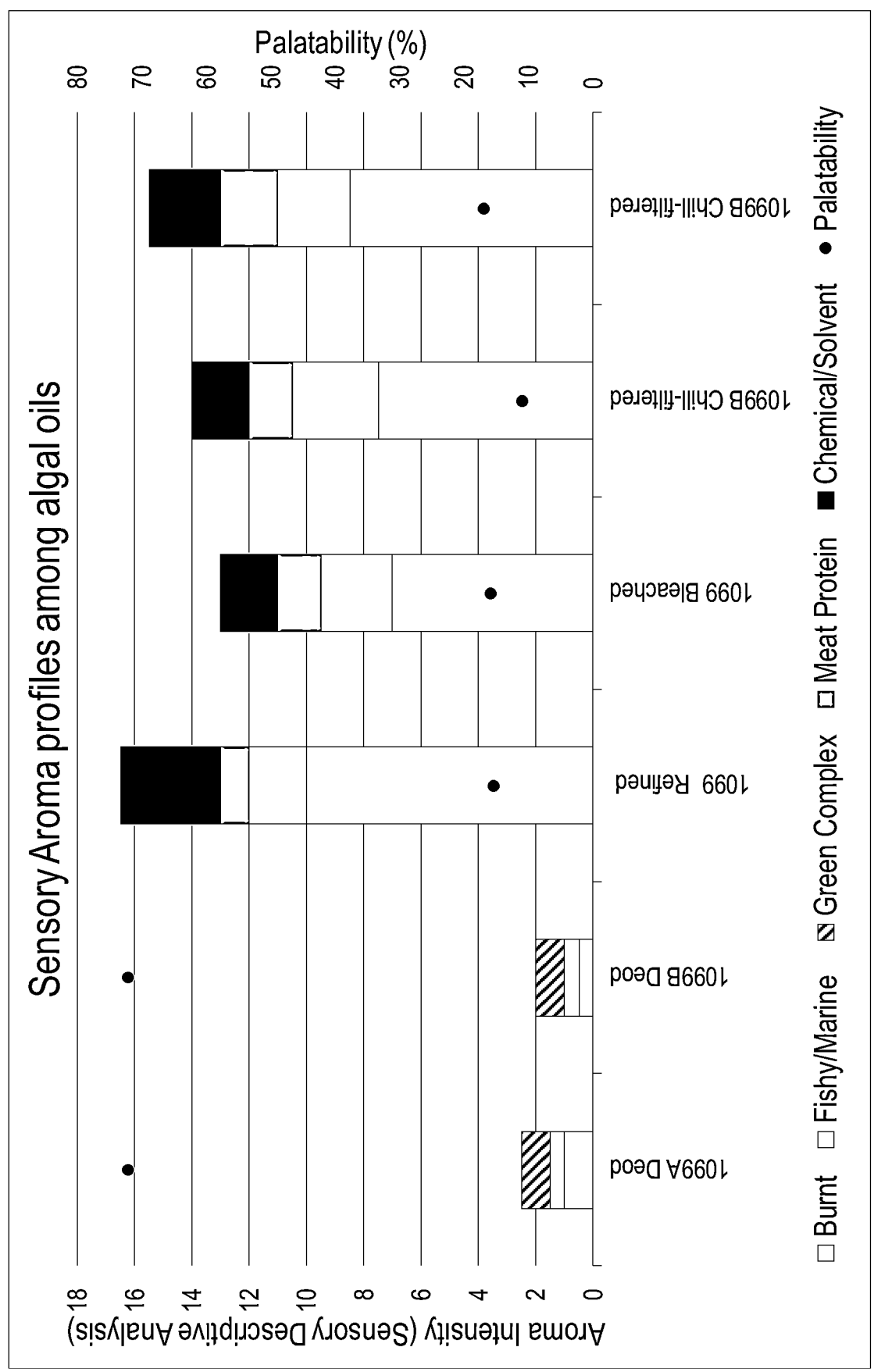

POLYUNSATURATED FATTY ACID CONTAINING FOOD INGREDIENT WITH ENHANCED PALATABILITY AND METHOD FOR MANUFACTURING THE SAME

CROSS-REFERENCE TO RELATED APPLICATIONS

This application is a National Stage of International Application No. PCT/US2019/066265, filed Dec. 13, 2019, which claims the benefit of U.S. Provisional Patent Application No. 62/779,660 filed on Dec. 14, 2018, the contents of which is hereby incorporated by reference in their entirety.

FIELD OF INVENTION

The present invention relates to a pet food and a human food of improved palatability whereas such food contains polyunsaturated fatty acids. The present invention relates to a method for manufacturing the above food ingredient.

BACKGROUND OF THE INVENTION

Makers of animal food have a business incentive to produce food which meet the following three criteria: high in nutritional value, high in palatability and low in production cost.

The nutritional value of polyunsaturated fatty acids (PUFAs) such as omega-3 fatty acids are well known in the art. PUFAs are biologically important molecules which affect cellular physiology due to their presence in cell membrane, regulate production of gene expression of biologically active compounds, and serve as biosynthetic substrates. For example, docosahexaenoic acid ("DHA") accounts for approximately 15%-20% of lipid in the animal's brain and 30%-60% of lipids in the retina. Because omega-3 fatty acids cannot be synthesized de novo by land animals, these fatty acids must be obtained from nutritional sources.

Polyunsaturated fatty acids are synthesized by microbes such as microalgae and fungi. Fish acquires polyunsaturated fatty acids by feeding on such microbes. Commercially, polyunsaturated fatty acids are obtained by extraction from fish, as well as by harvesting from microalgae or fungi via fermentation and extraction. Many chemicals are used in the process of extracting PUFA oil in order to expedite the extraction process via chemical reactions. Volatile byproducts are generated during such reaction. Many volatile byproducts, such as lipid oxidation products and Maillard reaction products, are produced in the extraction process.

When PUFA oil is initially extracted from fish or microalgae without any further refinement, it is called crude oil. Crude oil has offensive smell and taste, and thus is not well received and even rejected by human and animals.

When designing foods for human and companion animals such as cats and dogs, supplying high amount of nutrition is an important goal. However, if the human or animal refuses to eat the food because it finds the food unpalatable, such food will be of no value to said human or animal. The food product will also be of no value to the maker of such food because there is no market for it. Thus, there is a strong motivation to produce a PUFA-containing food ingredient that is palatable.

Crude oil needs to be purified before it is made ready for human consumption. In general, the purification process involves the steps of refinement, bleaching, winterization, and deodorization. Refinement involves removal of free fatty acids, phospholipids, oil soluble material, trace metal, and water-soluble molecules. Bleaching removes pigments, secondary oxidation products, trace metals, vitamins, environmental pollutants, and other polar components. Winterization is the name given to the process of removing sediments that will appear in oils at low temperature. Deodorization refers to the removal of volatile components, secondary oxidation products, free fatty acids, mono- and diglycerides, aldehydes, ketones, chlorinated hydrocarbons, pigments, and persistent organic pollutants. The above process is also referred to as RBWD process by the initial letter of the four steps.

It is costly to run all four steps of refinement, bleaching, winterization, and deodorization in an RBWD process because of the cost of equipment, energy, labor and time which are involved. In addition, as high as 55%-60% of the PUFA oil could be lost when a full RBWD process is run. Thus, although the offensive odor and taste of a crude PUFA oil may be removed by a full RBWD process, the cost of making such oil is high. Thus, it is only commonly run for making purified PUFA oil for human consumption. This renders it economically challenging to make and sell pet food which is palatable and yet contains nutritionally significant amount of PUFAs.

Thus, there is a need for a PUFA oil which is high in nutritional value and high palatability, and at the same time is produced at low cost.

Historically, efforts made to produce a PUFA-containing food ingredient which is low in cost but still has a reasonable level of palatability have been on focusing on creating palatability enhancers. For example, U.S. patent application Ser. No. 12/442,828 discloses an algal biomeal-based palatability enhancer which was claimed to be able to improve the texture and flavor of pet food. U.S. patent application Ser. No. 15/038,545 discloses a method of preparing a palatability enhancer by including appropriate fat sources and edible agents in the food. However, making a separate palatability enhancer and blending it into food has been proven costly. In addition, sometimes palatability enhancer adversely impacts or compromises the nutritional quality or other characteristics of the underlying pet food. Thus, there is still a need for finding a new approach to solve this problem. The goal for this invention is to find a method for making a PUFA oil that is high in palatability, but low in cost to produce.

BRIEF SUMMARY OF THE INVENTION

The present invention is directed to a method for enhancing the palatability of a polyunsaturated fatty acids (PUFA) oil to a companion animal, wherein said method comprises the steps of: a) obtaining a crude PUFA oil; b) optionally, degumming, or refining by using a short path evaporator (SPE), or both degumming and refining by using a SPE said PUFA oil from step a); and c) deodorizing the PUFA oil from step b); wherein the yield of the PUFA oil after step c) is no less than 85% of the amount of the crude oil started with at step a), wherein said palatability is measured by animal food preference test, and wherein the palatability score of the PUFA oil obtained after step c) is at least 10 percentage points higher than the crude oil started with at step a).

In one embodiment, the yield of the PUFA oil is no less than 90% of the crude oil started with at step a). In one embodiment, the above animal food preference test is a two-bowl test. In other embodiments, the palatability score of the PUFA oil obtained after step c) is at least 20, at least 30, at least 40, or at least 45 percentage points higher than the crude oil started with at step a).

In some embodiments, the deodorization step c) is conducted by using a VTA deodorizer or a DeSmet deodorizer.

In some embodiments, the PUFA oil is derived from fish, microorganism, or plants. In one embodiment, the microorganisms are algae. In another embodiment, the algae are *Schizochytrium, Aurantiochytrium*, or *Thraustochytrium*.

In some embodiments, the PUFA oil comprises one or more compounds of DHA, EPA, ARA, and DPA.

The present invention is also directed to a polyunsaturated fatty acid (PUFA) oil, wherein said PUFA oil comprise less than 10 ppb of one or more Maillard reaction compounds and more than 1.5 ppb of one or more lipid oxidation products, when qualified as ethyl heptanoate.

In some embodiments, the PUFA oil comprise less than 1 ppb, less than 0.5 ppb, or less than 0.3 ppb Maillard reaction compounds when qualified as ethyl heptanoate.

In one embodiment, the amount of Maillard reaction compounds in said PUFA oil is undetectable when qualified as ethyl heptanoate.

In one embodiment, Maillard reaction compounds are selected from a group consisting of: trimethylpyrazine, 2-ethyl-3,5-dimethylpyrazine, 2-ethyl-3,6-dimethylpyrazine, tetramethyl pyrazine, 2-hydroxy-3-methyl-2-cyclopenten-1-one, methyl-1H-pyrrole-2-carboxaldehyde, and indole. In another embodiment, the lipid oxidation products are selected from a group consisting of: 1-penten-3-one, 4-heptenal, and 2,6-nonadienal.

The present invention is also directed to a food composition for companion animals comprising a PUFA oil which is produced by the method of described above. The present invention is also directed to a food composition for a companion animal, wherein said food composition comprises the PUFA oil which comprise less than 10 ppb of one or more Maillard reaction compounds and more than 1.5 ppb of one or more lipid oxidation products, when qualified as ethyl heptanoate.

In some embodiment, the companion animal mentioned above is a dog or a cat.

In some embodiments, the above-mentioned food composition is a dog food, a cat food, a dog treat, or a cat treat. In one embodiment, the food composition is a nutritional supplement.

The present invention is also directed to a food composition for human consumption comprising a PUFA oil which is produced by the method of described above. The present invention is also directed to a food composition for human consumption, wherein said food composition comprises the PUFA oil which comprise less than 10 ppb of one or more Maillard reaction compounds and more than 1.5 ppb of one or more lipid oxidation products, when qualified as ethyl heptanoate.

The present invention is further directed to a method for increasing the yield of a polyunsaturated fatty acids (PUFA) oil over a control oil which is the same oil but has been refined, bleached, winterized and deodorized (RBWD oil), wherein said method comprises the steps of: a) obtaining a crude PUFA oil; b) optionally, degumming said PUFA oil, or refining by using a short path evaporator (SPE) said PUFA oil, or both degumming and refining by using a SPE said PUFA oil from step a); and c) deodorizing the PUFA oil from step b); wherein the yield of the PUFA oil after step c) is more than 5 percentage points higher than the yield of the RBWD oil.

In some embodiments, the yield of the PUFA oil after step c) is more than 10 or more than 20 percentage points higher than the yield of the RBWD oil.

In some embodiments, the difference between the palatability scores of the PUFA oil after step c) and the RBWD oil is less than 10% in an animal food preference test in which a common control sample oil is used. In another embodiment, the PUFA oil after step c) has a higher palatability score than the RBWD oil in an animal preference test in which a common control sample oil is used. In one embodiment, the animal food preference test is a two-bowl test.

In one embodiment, the deodorization step c) is conducted by using a VTA deodorizer or a DeSmet deodorizer.

In some embodiments, the PUFA oil is derived from fish, microorganism, or plants. In one embodiment, the microorganisms are algae. In another embodiment, the algae are *Schizochytrium, Aurantiochytrium*, or *Thraustochytrium*.

In some embodiments, the PUFA oil comprises one or more compounds of DHA, EPA, ARA, and DPA.

BRIEF SUMMARY OF DRAWINGS

FIG. 1 is a graph showing human sensory result of algal PUFA oil samples, where the aroma score of the deodorized and undeodorized algal oils and the palatability score of the same oils are shown.

DETAILED DESCRIPTION OF THE INVENTION

The features and advantages of the invention may be more readily understood by those of ordinary skill in the art upon reading the following detailed description. It is to be appreciated that certain features of the invention that are, for clarity reasons, described above and below in the context of separate embodiments, may also be combined so as to form sub-combinations thereof.

Embodiments identified herein as exemplary are intended to be illustrative and not limiting.

It is an objective of the present invention to provide a PUFA oil that is palatable for pet and/or human consumption and at the same time requires minimal treatment and thus can be produced at low cost.

It is another objective of the present invention to develop a method for producing a palatable PUFA oil more efficiently than a method using the conventional processing steps of refinement, bleaching, winterization, and deodorization.

It is another objective of the present invention to identify a group of compounds or an individual compound which is the main cause of off-odor and taste to pets, and the removal of which from crude PUFA oil would significantly improve the palatability of the PUFA oil.

The above objectives are accomplished in accordance with the present invention.

Crude microbial PUFA oil and crude fish oil are rich in polyunsaturated fatty acids, especially omega-3 polyunsaturated fatty acids, such as DHA and EPA. It is widely recognized that omega-3 polyunsaturated fatty acids, especially DHA and EPA, are essential nutrients to animals. Mammals such as human and pets have to obtain omega-3 polyunsaturated fatty acids from external sources because they cannot synthesize such nutrients internally. However, the unprocessed crude microbial PUFA oil and crude fish oil have strong offensive odor and taste which need to be removed before becoming suitable for human and pet consumption. Traditionally, the refining process is complex and involves at least four steps including refinement, bleaching, winterization, and deodorization, and thus is very costly and low in yield. This makes it economically challenging to produce pet food which contains enough PUFAs while remains competitive in price. As a result, few pets have access to diet which is rich in beneficial nutrients such as PUFAs.

It is surprisingly found in this invention that among the four oil processing steps of refinement, bleaching, winterization, and deodorization, deodorization is the most effective step in enhancing the palatability of the PUFA oil to a companion animal. It is further found that by adding either a degumming step or a refinement step, the palatability of the PUFA oil is further increased without much loss of yield in oil production. Thus, a palatable PUFA oil can be produced at a low cost by treating crude PUFA oil with a deodorizing step and optionally an additional degumming step or an additional refinement step, or both.

The change of palatability is measured by an animal food preference test. The animal food preference test used in this invention is a two-bowl test. The two-bowl test (or paired stimulus or versus test) compares how much of two foods, presented simultaneously, is eaten in a defined period of time. This is a common test used in expert panels for dog and cat palatability assessment studies. In the present invention, two pet food samples, each containing a different PUFA oil, are compared against each other. The first food contains a control PUFA oil. The second food contains a testing PUFA oil. The control PUFA oil can be any PUFA oil samples, either a crude oil or a processed oil. A commonly used control PUFA oil in this invention is a commercially available fish oil which has been treated by refining, bleaching, and deodorization steps. In another embodiment, the control PUFA oil is a commercially available fish oil which has been treated by refining, bleaching, winterization and deodorization steps. In one embodiment, the testing PUFA oil is a sample PUFA oil whose palatability is measured against the control PUFA oil. Such testing PUFA oil may be an unprocessed crude algal oil, or an algal oil which has been processed by one or more steps of degumming, short path evaporation, refining, bleaching, winterization and deodorization.

The palatability of a testing PUFA oil is considered as being improved over the other PUFA oil which it is paired with in a two-bowl test when the palatability score of the testing PUFA oil is above 50%. It means that the testing PUFA oil is preferred by the experimental animal more than 50% chance than the control PUFA oil. The two-bowl test and its scoring method are described in detail in Example 2 of this application. The two-bowl test is a type of animal food preference test, and it provides a quantitatively measurement of the food preference by an animal. The sum of the palatability score of the two sample being compared is always 100%. For example, if the palatability score of a testing PUFA oil is 56%, the palatability score of the other PUFA oil is 44%.

When several different testing PUFA oils are measured against the same PUFA oil, which in this case is called control PUFA oil or simply control oil, the relative preferences among the testing PUFA oil samples can be observed. For example, if the palatability score of testing PUFA oil samples A, B and C are 56%, 64% and 74%, respectively and all over a control oil, it can be concluded that sample C is the most palatable among the three samples. In this case, the identity of the control oil becomes irrelevant. This method is used in this invention to evaluate the effect of different processing steps on palatability improvement.

The palatability of a first testing PUFA oil is considered as being significantly improved over a second testing PUFA oil when the palatability score of the first testing PUFA oil is 20 percentage points or higher than the second PUFA oil. For example, if the palatability score of a testing PUFA oil which has been refined, bleached and winterized is 46%, and another testing PUFA oil which has been refined, bleached, winterized, and deodorized is 74%, the palatability of the testing PUFA oil is considered having been significantly improved by the additional odorization step because the increment of palatability score is 28%.

The yield of PUFA oil is defined as the percentage of PUFA oil which remains after one or several processing steps over the amount at the start of the process. Because each of the processing steps will remove some amount of the oil along with the impurities which it is designed to remove, it is generally expected that the yield of PUFA oil will decrease as more processing steps are added to the purification process.

It is surprising in this invention to find that the deodorization step is far more effective in enhancing the palatability of a PUFA oil to a companion animal than any one of the refining, bleaching, winterization steps or even the three steps combined. It is further surprising to find that by adding either a degumming step or a refining step, or both steps, a high yield of 90% or more of the crude oil is attained after these processing steps. The resulting oil has an increased palatability of at least 45 percentage points higher than the palatability score of the crude oil. A common control oil sample is used in measuring the palatability score of the processed oil and the crude oil.

In one embodiment, the present invention is directed to a method for enhancing the palatability of a polyunsaturated fatty acids (PUFA) oil to a companion animal, wherein said method comprises the steps of: a) obtaining a crude PUFA oil; b) optionally, refining, or both degumming and refining said PUFA oil from step a); c) deodorizing the PUFA oil from step b); wherein the yield of the PUFA oil after step c) is no less than 85% of the amount of the crude oil started with at step a), wherein said palatability is measured by animal food preference test, and wherein the palatability score of the PUFA oil obtained after step c) is at least 10 percentage points or higher than the PUFA oil obtained after step c). In another embodiment, the yield of the PUFA oil is no less than 80%, no less than 81%, no less than 82%, no less than 83%, no less than 84%, no less than 85%, no less than 86%, no less than 87%, no less than 88%, no less than 89%, no less than 90%, no less than 91%, no less than 92%, no less than 93%, no less than 94%, or no less than 95% when comparing the amount of PUFA oil obtained after step c) with the amount of the crude oil started with at step a). In another embodiment, the yield of the PUFA oil is between 85% and 99%, between 85% and 95%, between 87% and 93%, between 90% and 95%, and between 92% and 95%, when comparing the amount of PUFA oil obtained after step c) with the amount of the crude oil started with at step a).

In another embodiment, the increase of palatability score of the PUFA oil at the above level of yield is at least 10 percentage points higher, at least 15 percentage points higher, at least 25 percentage points higher, at least 30 percentage points higher, at least 35 percentage points higher, at least 40 percentage points higher, at least 45 percentage points higher, at least 50 percentage points higher, at least 55 percentage points higher, at least 60 percentage points higher, or at least 65 percentage points higher than the palatability score of the crude oil before processing. In another embodiment, the increase of palatability score of the PUFA oil at the above level of yield is between 20% and 65%, between 30% and 65%, between 40% and 65%, between 20% and 65%, between 30% and 50%, between 40% and 50%, between 30% and 60%, between 40% and 60%, between 20% and 30%, between 10% and 20%, or between 30% and 40% percentage points higher than the palatability score of the crude oil before processing.

It is also surprising in this invention to find that by replacing the conventional processing steps of refinement, bleaching and winterization (RBWD oil) with either a degumming step or a short path evaporation step or both steps while retaining the deodorization step, the yield of the resulting oil is more than 20 percentage points higher than the RBWD oil. The resulting oil also has an increased palatability of at least 10 percentage point higher than the palatability score of the RBWD oil. A common control oil sample is used in measuring the palatability score of the deodorized oil and the RBWD oil.

In one embodiment, the invention is directed to a method for increasing the yield of a polyunsaturated fatty acids (PUFA) oil over a control oil which is the same oil that has been refined, bleached, winterized and deodorized (RBWD oil), wherein said method comprises the steps of: a) obtaining a crude PUFA oil; b) optionally, degumming, or refining, or both degumming and refining said PUFA oil; c) deodorizing the PUFA oil from step b); wherein the yield of the PUFA oil after step c) is more than 30 percentage points higher than the yield of the RBWD oil. The yield of the RBWD oil is calculated as the percentage ratio between the amount of oil which remains after the crude oil at step a) is processed by refined, bleached, winterized and deodorized steeps and the amount of the crude oil at step a). In other embodiments, the yield of the PUFA oil after step c) is more than 25 percentage points higher, more than 20 percentage points higher, more than 19 percentage points higher, more than 18 percentage points higher, more than 15 percentage points higher, more than 13 percentage points higher, or more than 10 percentage points, more than 5 percentage points higher than the yield of the RBWD oil. In one embodiment, the palatability score of the above oil after step c) and the control oil are the same. In one embodiment, the palatability score of the above oil and the control oil has a difference of no more than 10%. In another embodiment, the difference of palatability score is no more than 9%, no more than 8%, no more than 7%, no more than 6%, no more than 5%, no more than 4%, no more than 3%, no more than 2%, or no more than 1%. In another embodiment, the difference of palatability score is between 1% and 10%, between 2% to 10%, between 3% and 10%, between 4% and 10%, between 5% and 10%, between 6% and 10%, between 7% and 10%, and between 4% and 7%. In another embodiment, the PUFA oil after step c) has a higher palatability score than the RBWD oil in an animal preference test in which a common control sample oil is used. In another embodiment, the PUFA oil after step c) has between 1 and 10, between 5 and 10, or between 7 to 10 percentage points higher palatability score than the RBWD oil in an animal preference test in which a common control sample oil is used. In another embodiment, the PUFA oil after step c) has a higher palatability score of between 1% and 10%, between 2% to 10%, between 3% and 10%, between 4% and 10%, between 5% and 10%, between 6% and 10%, between 7% and 10%, and between 4% and 7% than that of the RBWD oil.

In one embodiment, the above objectives are accomplished by a method of enhancing the palatability of a PUFA oil comprising the step of treating said oil with a deodorizer. In a preferred embodiment, the deodorizer is a VTA deodorizer. In another preferred embodiment, the deodorizer is a DeSmet deodorizer. In another embodiment, the above method further comprises a degumming step and/or a short path evaporation step. In a yet another preferred embodiment, the method does not comprise any refinement, bleaching or winterizing step, and thus significantly increases the yield of PUFA oil in the process and reduces the cost of production. The degumming step and the SPE step cause little oil yield loss. The refinement, bleach and winterization steps cause significant yield loss.

Without being bound by theory, it is hypothesized that deodorizer removes Maillard reaction compounds and thus helps to remove the off-odor(s) and taste(s) of the PUFA oil and improve its palatability. It is also hypothesized that degumming removes materials from the PUFA oil such as phospholipids and other compounds and anything which may clog the deodorizer in the subsequent deodorization step. It is also hypothesized that the short path evaporation (SPE) step removes free fatty acids from the PUFA oil and thus avoid oxidation of the resulting PUFA oil. In the present invention, the steps of degumming and refining are optional because the application of these steps will depend on the quality of the crude oil which is being processed. If the starting crude PUFA oil contains little free fatty acids, the refining step may be omitted. Similarly, if the starting crude oil contains little phospholipids or other impurities and thus the oil is unlikely to clog the deodorizer, the degumming step may be omitted too.

It was known that volatiles produced during the process of extracting PUFA oil from its source, either algal or fish, generally cause off-odor(s) and flavor(s). Examples of off-odor causing volatiles include but are not limited to lipid oxidation products such as 1-penten-3-one, 4-heptenal, 2,6-nonadienal, and Maillard reaction compounds such as trimethylpyrazine, 2-ethyl-3,5-dimethylpyrazine, 2-ethyl-3,6-dimethylpyrazine, tetramethyl pyrazine, 2-hydroxy-3-methyl-2-cyclopenten-1-one, ethyl-1H-pyrrole-2-carboxaldehyde, and indole. Surprisingly, it was found in this invention that removal of Maillard reaction products, but not lipid oxidation products, can significantly enhance the palatability of PUFA oil. It is found that deodorizers are very effective in stripping Maillard reaction products from crude PUFA oils and thus enhance the palatability of these oils.

In one embodiment, a crude PUFA oil is treated to remove all or substantially all Maillard reaction compounds wherein the resulting oil has a significantly higher palatability score than the crude PUFA oil. In one embodiment, the above Maillard reaction compounds was narrowed down to the following list: trimethylpyrazine, 2-ethyl-3,5-dimethylpyrazine, 2-ethyl-3,6-dimethylpyrazine, tetramethyl pyrazine, 2-hydroxy-3-methyl-2-cyclopenten-1-one, methyl-1H-pyrrole-2-carboxaldehyde, and indole. It is found in the present invention that the removal of the above seven compounds from a crude alga oil or a crude fish oil can significant increase the palatability of such oil to companion animals. It is further found in the present invention that the level of lipid oxidation products in the PUFA oil does not significantly impact the palatability of the oil. Examples of lipid oxidation products include but are not limited to: 1-penten-3-one, 4-heptenal, and 2,6-nonadienal.

In one embodiment, the palatability of PUFA oil is significantly improved by removing Maillard reaction compounds from crude PUFA oil to a none-detectable level. In one embodiment, the method for detecting Maillard reaction compounds and lipid oxidation products is a SPME-GCMS analysis method. In another embodiment, the palatability of PUFA oil to human and pet is significantly improved by reducing the level of Maillard reaction compounds in the PUFA oil to less than 10 ppb of Maillard reaction compounds when qualified as ethyl heptanoate. In another embodiment, the palatability of PUFA oil to human and pet is significantly improved by reducing the level of Maillard reaction compounds in the PUFA oil to less than 10 ppb of Maillard reaction compounds when qualified as ethyl heptanoate, whereas the lipid oxidation products in the PUFA oil is at a level of more than 1.5 ppb when qualified as ethyl heptanoate. In another embodiment, the palatability of PUFA oil to human and pet is significantly improved by reducing the level of Maillard reaction compounds in the crude oil to less than 1 ppb of Maillard reaction compounds when qualified as ethyl heptanoate. In another embodiment, the palatability of PUFA oil to human and pet is significantly improved by reducing the level of Maillard reaction compounds in the crude oil to less than 0.5 ppb of Maillard reaction compounds when qualified as ethyl heptanoate. In another embodiment, the palatability of PUFA oil to human and pet is significantly improved by reducing the level of Maillard reaction compounds in the crude oil to less than 0.3 ppb of Maillard reaction compounds when qualified as ethyl heptanoate. In other embodiments, the palatability of PUFA oil to human and pet is significantly improved by reducing the level of Maillard reaction compounds in the crude oil to less than 500, less than 200, less than 100, less than 50, less than 20, less than 5, less than 2, less than 0.2, less than 0.1 ppb when qualified as ethyl heptanoate. In other embodiments, the palatability of PUFA oil to human and pet is significantly improved by reducing the level of Maillard reaction compounds in the crude oil to between 500 and 0.1 ppb, between 200 and 0.1, between 200 and 0.1, between 100 and 0.1, between 50 and 0.1, between 10 and 0.1, between 2 and 0.1, between 1 and 0.1, and between 20 and 1, and between 10 and 1 when qualified as ethyl heptanoate.

The numerical value of the level of Maillard reaction compounds and lipid oxidation products which is referred to in this application (in the unit of ppb) is the total amount of Maillard reaction compounds and lipid oxidation products detected in the PUFA oil, unless it is specifically referred to as the level of an individual Maillard reaction compound and lipid oxidation product.

In another embodiment, the palatability of PUFA oil to a human and a pet animal is significantly improved by reducing the level of Maillard reaction compounds in the PUFA oil to less than 10 ppb of Maillard reaction compounds, whereas the PUFA oil comprises more than 1.5 ppb of one or more lipid oxidation products, when qualified as ethyl heptanoate. In one embodiment, the lipid oxidation products are selected from a group consisting of: 1-penten-3-one, 4-heptenal, and 2,6-nonadienal. In other embodiments, the lipid oxidation products in the PUFA oil is at a level of more than 1 ppb, more than 2 ppb, more than 3 ppb, more than 4 ppb, or more than 5 ppb, more than 20 ppb, more than 50 ppb, or more than 100 ppb, when qualified as ethyl heptanoate. In other embodiments, the lipid oxidation products in the PUFA oil is at a level of between 100 and 1 ppb, between 50 and 1 ppb, between 20 and 1 ppb, and between 15 and 1 ppb, when qualified as ethyl heptanoate. In other embodiments, the level of Maillard reaction compounds in the crude oil is less than 500, less than 200, less than 100, less than 50, less than 20, less than 5, less than 2, less than 0.2, less than 0.1 ppb when qualified as ethyl heptanoate.

In another embodiment, the palatability of PUFA oil is significantly improved by removing not only Maillard reaction compounds from crude PUFA oil to a low or none-detectable level, but also all or substantially all free fatty acids. In another embodiment, the palatability of PUFA oil is significantly improved by removing not only Maillard reaction compounds from crude PUFA oil to a low or none-detectable level, but also all or substantially all phospholipids and cations. In another embodiment, a crude oil is treated to remove all or substantially all of Maillard reaction compounds, free fatty acids, phospholipids and cation. In one embodiment, the free fatty acids are removed from the PUFA oil to a level of less than 0.1% by weight of the oil. In some embodiments, the level of Maillard reaction compounds in the crude oil is less than 500, less than 200, less than 100, less than 50, less than 20, less than 5, less than 2, less than 0.2, less than 0.1 ppb when qualified as ethyl heptanoate. In one embodiment, the free fatty acids are removed from the PUFA oil to a level of between 1% and 0.01% by weight of the oil. In another embodiment, the free fatty acids are removed from the PUFA oil to a level of less than 0.01% by weight of the oil. In one embodiment, the phospholipids are removed from the PUFA oil to a level of less than 0.1% by weight of the oil. In one embodiment, the phospholipids are removed from the PUFA oil to a level of between 1% and 0.01% by weight of the oil. In another embodiment, the phospholipids are removed from the PUFA oil to a level of less than 0.01% by weight of the oil. In one embodiment, the cations are removed from the PUFA oil to a level of less than 0.1% by weight of the oil. In another embodiment, the cations are removed from the PUFA oil to a level of less than 0.01% by weight of the oil. In one embodiment, the cations are removed from the PUFA oil to a level of between 1% and 0.01% by weight of the oil.

Also disclosed herein is a method for enhancing palatability of a PUFA oil wherein the PUFA oil is treated by a deodorizer. In one embodiment, the deodorizer is a DeSmet deodorizer. In another embodiment, the deodorizer is a VTA deodorizer. In yet another embodiment, the deodorizer can be any type of equipment which can effectively remove Maillard reaction compounds. In yet another embodiment, the deodorizer can be any type of equipment which can effectively remove a list of Maillard reaction compounds comprising: trimethylpyrazine, 2-ethyl-3,5-dimethylpyrazine, 2-ethyl-3,6-dimethylpyrazine, tetramethyl pyrazine, 2-hydroxy-3-methyl-2-cyclopenten-1-one, methyl-1H-pyrrole-2-carboxaldehyde, and indole. Also disclosed herein is a method for enhancing palatability of a PUFA oil wherein the PUFA oil is treated by a short path evaporator. Further disclosed herein is a method for enhancing palatability of a PUFA oil wherein the PUFA oil is treated by a degumming process.

In general, a PUFA-containing pet food is made by mixing pet food ingredients with PUFA oil or PUFA powder. Similarly, a PUFA-containing food for human consumption is made by mixing human food ingredient and PUFA oil or PUFA powder. The present invention provides for a palatability enhanced pet food by mixing pet food ingredients and the deodorized PUFA oil which is described above. The invention also provides for a palatability enhanced human food by mixing human food ingredients and the deodorized PUFA oil which is described above. The invention also provides for a palatability enhanced human nutritional supplement composition by mixing human nutritional supplement ingredients and the deodorized PUFA oil which is described above.

The PUFA oil described herein refers to an oil which comprises PUFAs. In one embodiment, the PUFA oil described herein refers to an oil which comprises significant amount of PUFAs. In some embodiments, oil comprises at least 10%, at least 20%, at least 30%, at least 40%, at least 5%, at least 60%, at least 70%, or at least 80% by weight PUFAs. The source of such PUFAs in the PUFA oil may either comes from fish or microbes. In some embodiments, the microbes are algae, bacteria, fungi, yeast, protist. If a significant amount of PUFAs are derived from microbe, it is referred to as microbial oil. If a significant amount of PUFAs are derived from microalgae, it is referred to as algal oil. If a significant amount of PUFAs are derived from fish, it is referred to as fish oil.

Polyunsaturated fatty acids (PUFAs) are classified based on the position of the first double bond from the methyl end of the fatty acid; omega-3 (n-3) fatty acids contain a first double bond at the third carbon, while omega-6 (n-6) fatty acids contain a first double bond at the sixth carbon. For example, docosahexaenoic acid (DHA) is an omega-3 long chain polyunsaturated fatty acid (LC-PUFA) with a chain length of 22 carbons and 6 double bonds, often designated as "22:6n-3." In one embodiment, the PUFA is selected from an omega-3 fatty acid, an omega-6 fatty acid, and mixtures thereof. In another embodiment, the PUFA is selected from LC-PUFAs. In a still further embodiment, the PUFA is selected from docosahexaenoic acid (DHA), eicosapentaenoic acid (EPA), docosapentaenoic acid (DPA), arachidonic acid (ARA), gamma-linolenic acid (GLA), dihomo-gamma-linolenic acid (DGLA), stearidonic acid (SDA), and mixtures thereof. In another embodiment, the PUFA is selected from DHA, EPA, DPA, ARA, and mixtures thereof. In a further embodiment, the PUFA is DHA. In yet a further embodiment, the PUFA is EPA. In yet a further embodiment, the PUFA is ARA.

The PUFAs can be in the form of a free fatty acid, salt, fatty acid ester (e.g. methyl or ethyl ester), monoacylglycerol (MAG), diacylglycerol (DAG), triacylglycerol (TAG), and/or phospholipid (PL).

Free fatty acids are polyunsaturated fatty acids that have been lost from the triacylglyceride backbone or break away from oil molecules. Reduction of free fatty acids in PUFA oil is expected to reduce oxidation in long term and thus prolong shelf life of the PUFA oil.

Crude microbial PUFA oil is normally extracted from microbial cells. As used herein, a "cell" refers to an oil-containing biomaterial, such as biomaterial derived from oleaginous microorganisms. In one embodiment, crude microbial oil refers to a crude oil extracted from the biomass of the microorganism without further processing. Crude microbial oil is normally treated before being used in pet food or human food.

As used herein, a "microbial cell" or "microorganism" refers to organisms such as algae, bacteria, fungi, yeast, protist, and combinations thereof, e.g., unicellular organisms. In some embodiments, a microbial cell is a eukaryotic cell. A microbial cell includes, but is not limited to, golden algae (e.g., microorganisms of the kingdom Stramenopiles); green algae; diatoms; dinoflagellates (e.g., microorganisms of the order Dinophyceae including members of the genus *Cryptheccodinium* such as, for example, *Cryptheccodinium cohnii* or *C. cohnii*); microalgae of the order Thraustochytriales; yeast (Ascomycetes or Basidiomycetes); and fungi of the genera *Mucor, Mortierella*, including but not limited to *Mortierella alpina* and *Mortierella sect, schmuckeri*, and *Pythium*, including but not limited to *Pythium insidiosum*.

In one embodiment, the microbial cells are from the genus *Mortierella*, genus *Cryptheccodinium*, or order Thraustochytriales. In a still further embodiment, the microbial cells are from *Cryptheccodinium cohnii*. In yet an even further embodiment, the microbial cells are selected from *Cryptheccodinium cohnii, Mortierella alpina*, genus *Aurantiochytrium*, genus *Thraustochytrium*, genus *Schizochytrium*, and mixtures thereof.

Crude fish oil is normally extracted from fish without further processing. In one embodiment, such fish may be sardine, anchovy, mackerel and/or tuna fish. Crude fish oil is normally treated before being used in pet food or human food.

Plant oil is normally extracted from plant seeds. Examples of oil producing plant include canola, soybean, sunflower, flax, and camelina. In some embodiments, the plant referred to in this invention are plants which are genetically modified to produce PUFA oil.

As used herein, a "companion animal" refers domesticated or domestic-bred animals whose physical, emotional, behavioral and social needs can be readily met as companions in the home, or in close daily relationship with humans. Examples of companion animals are dogs, cats, guinea pigs, rabbits, rats, mice, or horses. It is used interchangeably with the term "pet" or "pet animal" in this application.

A "treated PUFA oil" or a "processed PUFA oil" or simply a "treated oil" or a "processed oil" as used in this application refers to a PUFA oil which has been processed from a crude PUFA oil. In one embodiment, such treatment includes one or more step of refining, bleaching, winterizing, deodorizing, degumming or short path evaporation. In one embodiment, such treatment includes only the deodorizing step.

The treated PUFA oil of the present invention can be blended to a base pet food product, such as a dry pet or animal food. The pet food composition of the present intention includes various moist, oily, powdered or granular flavor additive compositions. In one embodiment, the treated PUFA oil may be incorporated into the pet food as part of the manufacturing process.

In the present method, pet food products comprising treated PUFA oil from microbes or fish.

The present invention is directed to a food product composition for a non-human animal or human, comprising any of the microbial oils of the invention. In some embodiments, the food product is an additive for the non-human animal or human food. In some embodiments, the food product is a nutritional supplement. In some embodiments, the food product is an animal feed. In some embodiments, the animal feed is a pet food.

EXAMPLES

Example 1

PUFA Oil Samples and Processing Methods

A crude algal oil used in this invention was extracted from the biomass of *Schizochytrium* strain ATCC PTA-10208 without further processing. Different batches of this type of crude algal oil were produced and used in this invention.

Purification Processes

The above crude algal oil was processed by one or more of the purification steps described below.

Refinement

In this refinement step, a crude algal PUFA oil(s) was heated to 50-55° C. under nitrogen. Next, about 2% phosphoric acid was added and then mixed for 15 minutes. Based of the amount of crude free fatty acids (crude FFA) in the crude algal oil, the amount of 50% caustic solution and soft water for making a caustic/H$_2$O solution was calculated using the formula below. Excess caustic factor was increased to account for neutralizing phosphoric acid.

50% Caustic=[(0.142×Crude FFA)+3.7]×Crude algal PUFA oil wt (kg)/50

H$_2$O=0.05×Crude algal PUFA oil weight (kg)

The caustic/H$_2$O solution was added to the algal oil/phosphoric acid mixture and was held for 30 minutes. 2.5% Brine Solution and 2.5% H$_2$O were added. The resulting solution was then heat to 80-85° C. and then centrifuged. The resulting oil was isolated, and was either tested for palatability or further processed by additional steps.

Bleach

Under nitrogen, the algal PUFA oil from the previous processing step, such as the refinement step, was heated to 50-55° C. 0.25-1.4% of Trisyl® (made by WR Grace Co. U.S.A.) based soaps was added to the heated solution and the solution was hold for 15 min. A 2% F-72FF type of bleaching clay was added under vacuum. The oil was heated to 90-95° C. and once the oil reaches set point, it was hold for 60 min. After the hold the remaining oil was filtered at 91-95° C. using a vertical leaf filter (VLF). The resulting oil was isolated, and was either tested for palatability or further processed by additional steps.

Winterization

The algal PUFA oil from the previous processing step, such as the bleach step, was heated to 60° C. if below 45° C. The oil is then cooled to 19° C. or 7° C., and was held at that temperature for 4 hours. Next, 1% Celpure® was added (filter aid from Imerys Filtration Minerals Inc. U.S.A.) and the oil was mix for 15 minutes. The filter used in this step is a membrane filter press. The resulting oil was isolated, and was either tested for palatability or further processed by additional steps.

Degumming

Under nitrogen, the algal PUFA oil from the previous processing step was heated to 90-95° C. 3% citric acid (50% solution) and 10% H$_2$O was added and mixed for 4 hours. After the hold time is complete, the oil solution was decanted for another 4 hours. The oil was washed with water with 10% of degummed oil weight. Mix for 4 hours and decant for 4 hrs. Dry the oil under vacuum and nitrogen at 50-60° C. until moisture is <0.5%. The filter used in this step is a membrane filter press. The resulting oil was isolated, and was either tested for palatability or further processed by additional steps.

Short Path Evaporation

Short path evaporation or SPE is a specific type of refinement. It was conducted in a commercially available short path evaporator purchased from LCI Corporation, U.S.A.

In this short path evaporator, the rotor cage assembly surrounds an internal condenser and revolves at moderate speeds. Feed was fed through a nozzle at the top of the unit and is spread into a thin film on the inside surface of the shell via the rotor blades.

The cage-type construction and location of the internal condenser create a short vapor flow path or "short path". The operating pressure was set to 0.1 mbar compared. The heating media temperatures was set at 240° C. The flow rate was 13 L/hour.

The distillate and the remaining liquid concentrate drained out through separate outlets at the bottom of the unit. The resulting oil was isolated, and was either tested for palatability or further processed by additional steps.

Deodorization

Deodorization was performed in a VTA deodorizer or in a DeSmet deodorizers at either a continuous condition or a batch condition as shown in Table 1 below.

TABLE 1

| Deodorizer | Operating Parameters | | | |
|---|---|---|---|---|
| | Temperature | Pressure | Feed Rate | Steam Rate |
| VTA Deodorizer | 180 | 1 mbar | 10 kg/Hr | 8.3 mL/min |
| DeSmet Continuous Deodorizer | 205 | 4 mbar | 7 kg/hr | 3.5 mL/min |
| DeSmet Batch Deodorizer | 170-190 | 4 mbar | NA | 3.5 mL/min |

The VTA deodorizer was made by VTA Verfahrenstechnische Anlagen GmbH & Co. KG, Germany. The DeSmet deodorizer was made by Desmet Ballestra Group, Belgium. The deodorization process was run at the condition specified by the manufactures.

The resulting oil was collected from the deodorizer and was either tested for palatability.

Example 2

Pet Food Palatability Animal Test

Pets such as domestic dogs and cats have different nutritional requirements and are sensitive to numerous palatability drivers. The animal food preference test used here is designed to identify the preference of PUFA-containing food by the tested animals.

In preference testing, animals have the choice between two different diets presented simultaneously. This is also called two-bowl test. In this two-bowl test, it is compared that how much of two foods, presented simultaneously, is eaten in a defined period of time. This is the most common test used in expert panels for dog and cat palatability assessment studies. It compares two products and establishes a preference based on the difference of quantities consumed. In such tests, two identical bowls were delivered simultaneously to the tested animal, each bowl containing one of the two products to be tested (A or B). The animal has free access to the bowls for a preset period of time. The quantity available in each bowl is more than sufficient to cover the energetic requirements. At the end of the feeding time or when one bowl is finished, bowls are taken back and weighted again to measure the quantity consumed.

A total of 30 dogs were enrolled in every two-bowl tests conducted in this invention. Each test lasted for two days. In the test, two diets, Diet A and Diet B, were prepared. Diet A is a Kibble brand pet food mixed with a testing PUFA oil sample. Diet B is the same Kibble brand pet food mixed with a control PUFA oil sample. The Kibble brand pet food may be either a dog food or a cat food, depending on which kind of animal that the test was performed on. In the test, the average daily consumption of each diet A and B of each dog or cat was measured. The amount of Diet A and Diet B consumed by each of the 30 dogs during the two-day period was measured. The individual intake ratios between Diet A and Diet B for each of the 30 dogs were calculated. The average of the 30 individual intake ratio for each diet A and B were calculated and used as indicator of the superiority of palatability of one of the two diets.

The same two-bowl tests were conducted on cats by following the same protocols as described above. The average of the individual cat intake ratio for each diet A and B were calculated and used as indicator of the superiority of palatability of one of the two diets.

Example 3

In order to identify the impact of each of the steps in the PUFA oil purification process, algal oil samples processed by one or more of the refinement, bleach, winterization and deodorization steps described in Example 1 were collected. Palatability of these oil samples were measured using the testing protocol described in Example 2. The testing samples include an unprocessed crude algal oil as described in Example 1, and oils which were refined, and/or bleached, and/or winterized.

A commercial fish oil sample was purchased from pet food producer and was labeled "RC fish oil". This oil was refined, bleached, and deodorized by its manufacture before it was purchased.

The "RC fish oil" was used as a control oil, and it was compared with the testing oil samples described above. The test results are summarized in Table 2.

TABLE 2

| Base Food and control oil | | Crude Algal Oil | Refinement | Bleached | Winterized | Deodorized VTA |
|---|---|---|---|---|---|---|
| Dog food and RC Fish Oil | Process Palatability Score (% Intake) | 22.9 | | | | |
| | Process Palatability Score (% Intake) | | 26.8 | | | |
| | Process Palatability Score (% Intake) | | | 31.8 | | |
| | Process Palatability Score (% Intake) | | | | 46.4 | |
| | Process Palatability Score (% Intake) | | | | | 74 |

Data in Table 2 shows that when an unprocessed crude algal oil was refined, bleached and winterized but was not yet deodorized, the improvement on palatability of the oil is incremental, e.g., from an intake ratio of 22.9% for a crude algal oil (when comparing to the control oil sample RC fish oil), to 26.8% after refinement, to 31.8% after both refinement and bleaching, and to 46.4% after refinement, bleaching and winterization. The control oil sample RC fish oil is still preferred by the dogs in the test over the testing sample which was triple-processed by the refinement, bleaching and winterization steps. However, when an additional step of deodorization was performed, the palatability score of the oil increased 27.6 percentage points from 46.4% to 74%. This increase is higher than all three steps of refinement, bleaching and winterization combined, which is 23.5 percentage points. It shows that the deodorization step is far more effective than the refinement, bleaching and winterization steps in improving the palatability of algal PUFA oil.

Example 4

In the next experiment, the yield loss by each of the processing steps were examined and the optimal combination of processing steps were identified.

The yield of a crude algal PUFA oil was examined after one or more processing steps of refinement, bleaching, winterization and deodorization steps was added to the purification process. In addition, the yield of the oil after it ran through two other processing steps, —degumming step and short path evaporation (SPE) step, was also examined. Palatability scores of the above processed oils were measured and compared. The oil processing was conducted based on the methods as described in Example 1. Palatability test was conducted as described in Example 2, using the RC fish oil as control oil. The crude algal oil used in this example is an unprocessed crude algal oil as described in Example 1. The test results are summarized in Table 3.

TABLE 3

| Control Oil | Experiment No. | Testing Algal Oil Name and Processing Steps | Yield % | Palatability % |
|---|---|---|---|---|
| RC Fish Oil | 1 | Crude algal oil | NA | 24.8 |
| | 2 | Refined + Bleached + Winterized at 11° C. + DeSmet Continuous Deodorized | 74.5 | 63.6 |
| | 3 | Refined + Bleached + DeSmet Continuous Deodorized | 83.9 | 56.8 |
| | 4 | Refined + DeSmet Continuous Deodorized | 90.7 | 61.4 |
| | 5 | Refined + VTA | 90.8 | 71.9 |
| | 6 | SPE | 94.6 | 56.5 |
| | 7 | SPE + DeSmet Continuous Deodorized | 90.1 | 78.6 |
| | 8 | SPE + DeSmet Batch Deodorized | 94.3 | 62.4 |
| | 9 | Degummed, SPE + DeSmet Continuous Deodorized | 92.2 | 73.2 |
| | 10 | Degummed, SPE + VTA | 92.0 | 60.1 |

The test results showed that when the common oil processing steps such as refinement, bleaching and winterization were employed in purifying a crude algal oil, up to 25.5% of the original crude algal oil was lost throughout the process (Experiment No. 1). If one or more of the processing steps is removed, such as the winterization step, the oil yield improved but oil palatability worsened (Experiment No. 2). However, if all three steps of refinement, bleaching and winterization were replaced by a degumming step and/or a SPE step while retaining the deodorization step, a yield of above 90% was achieved while a palatability score which is similar to or better than the RBWD oil was preserved (Experiment Nos. 7-10). Surprisingly, it was found that a degummed, SPE, and deodorized oil has a 92.2% yield (Experiment No. 9), which is about 24% increase from the 74.5% yield of the RBWD oil (Experiment No. 1). The palatability of this oil is 73.2% (Experiment No. 9), which is more than 9% higher than the 63.6% palatability score of the RBWD oil (Experiment No. 1).

Example 5

SPME-GCMS Analysis of Volatiles in PUFA Oil Samples

To identify and quantify those compounds which have been removed from the algal PUFA oil samples by the deodorization process and thus purportedly caused the improvement of palatability, a SPME-GCMS analysis was conducted using ethyl heptanoate as an internal standard. As a result, approximate concentrations in part per billion (ppb) for specific volatiles that are related to odor in algal PUFA oil or fish PUFA oil were identified.

A list of ten volatiles which are commonly detected in crude fish PUFA oil and crude algal PUFA oil are described in Table 4. Lipid oxidation products such as 1-penten-3-one, 4-heptenal, and 2,6-nonadienal are commonly found in crude fish oils and cause offensive flavor. The Maillard reaction products in Table 4 are commonly found in aqueous extracted algal oil and cause offensive flavor. In order to quantify the amount of nine lipid oxidation products and Maillard reaction products in the PUFA oil samples, an eleventh sample of ethyl heptanoate was added as an internal standard into the target volatiles list.

TABLE 4

| Volatile compound | Reaction source | Quantification ion (m/z) |
| --- | --- | --- |
| 1-penten-3-one | lipid oxidation product | 84 |
| 4-heptenal | lipid oxidation product | 84 |
| 2,6-nonadienal | lipid oxidation product | 70 |
| Trimethylpyrazine | Maillard reaction product | 122 |
| 2-ethyl-3,5-dimethylpyrazine | Maillard reaction product | 135 |
| 2-ethyl-3,6-dimethylpyrazine | Maillard reaction product | 135 |
| Tetramethyl pyrazine | Maillard reaction product | 136 |
| 2-hydroxy-3-methyl-2-cyclopenten-1-one | Maillard reaction product | 112 |
| Methyl-1H-pyrrole-2-carboxaldehyde | Maillard reaction product | 109 |
| Indole | Maillard reaction product | 90 |
| Ethyl heptanoate | Internal Standard (added) | 88 |

Ten algal PUFA oil and fish PUFA oil samples, either crude or refined, were analyzed for the ten volatiles of Table 4. Each of the ten PUFA oil samples was tested in duplicate. For each replicate, 3 g of oil was used in a 20 mL headspace vial along with 0.05 g of a 123 ppb internal standard solution of ethyl heptanoate in miglyol. The samples were vortexed to mix thoroughly, and the final internal standard concentration was about 2 ppb in each oil sample. Sample and internal standard weights were recorded accurately for each replicate. A 2 cm manual SPME "triple phase" fiber (PDMS (polydimethylsiloxane)/carboxen/DVB (Divinyl benzene)) was exposed in the vial for 30 minutes at 75° C. after a 2 minutes equilibration. The instrument and method used were the GCO apparatus, but only the mass spectral data was recorded. The volatiles which were measured are listed in Table 4.

The ion peak areas, recorded sample and internal standard weights, and the concentration of the internal standard were used to calculate the approximate concentration for each volatile of interest (See Equation 1). This assumes an equivalent response to the ethyl heptanoate internal standard. Therefore, these approximate concentrations are reported as ppb (part per billion) as ethyl heptanoate.

Conc (ppb) volatile=ion peak area volatile/ion peak area IS*conc IS in sample  Equation 1:

Where ion peak area IS=peak area for 88 m/z ion of ethyl heptanoate
And ion peak area volatile=peak area for selected ion for each volatile of interest (listed in Table 1)
And conc IS in sample=conc IS spike (123 ppb)*IS spike weight/(sample weight+IS spike weight)

The average concentrations in ppb (as ethyl heptanoate) for each volatile and each sample are listed in Table 5 below, along with palatability data if known. Some peaks were measured down to 0.1 ppb while others were detected but could not be reliably quantified at even lower levels, so they are reported as <0.1 ppb. Peaks below the limit of detection (0.01 ppb as ethyl heptanoate) were labelled as not detected (nd).

The "Algal oil sample 1 crude" sample refers to an unprocessed crude algal oil extracted from *Schizochytrium* strain ATCC PTA-10208.

The "Algal oil sample 1 RBWD deo VTA" sample refers to the ensuing oil after the crude algal oil sample "Algal oil sample 1 crude" was refined, bleached, winterized and deodorized by a VTA deodorizer.

The "Algal oil sample 1 RBWD deo demet" sample refers to the ensuing oil after the crude algal oil sample "Algal oil sample 2 crude" was refined, bleached, winterized and deodorized by a DeSmet deodorizer.

The "Algal oil sample 1 BWD deo demet" sample refers to the ensuing oil after the crude algal oil sample "Algal oil sample 1 crude" was bleached, winterized and deodorized by a DeSmet deodorizer.

The "Algal oil sample 2 BWD deo demet" sample refers to the ensuing oil after a second sample of an unprocessed crude algal oil extracted from *Schizochytrium* strain ATCC PTA-10208 was bleached, winterized and deodorized by a DeSmet deodorizer.

An RC fish oil was used as the control oil sample for the above 5 algal oil samples in the two-bowl food preference tests.

A commercial fish oil sample was purchased from Ocean Nutrition Corp. and was labeled "Fish oil Sample 3". This oil was refined, bleached, and deodorized. This oil was used as the control oil sample for "Fish oil sample 3 RBWD" in the two-bowl food preference test.

The "Fish oil sample 3 RBWD" sample refers to the ensuing oil after "Fish oil sample 3" was refined, bleached, winterized and deodorized by a DeSmet deodorizer.

The "Algal oil sample 4 crude" sample refers to a forth sample of an unprocessed crude algal oil extracted from *Schizochytrium* strain ATCC PTA-10208.

The "Algal oil sample 4 RBWD deo demet" sample refers to the ensuing oil after the crude algal oil sample "Algal oil sample 4 crude" was refined, bleached, winterized and deodorized by a DeSmet deodorizer.

Crude algal oil samples 1, 2 and 4 are from separate batches of crude algal oil extracted from *Schizochytrium* strain ATCC PTA-10208.

As shown in Table 5, the crude oils are distinctly different from their corresponding deodorized oils, for both fish and algal oils. Deodorization results in some decrease in the approximate concentration of all the volatiles compared to their crude state. Crude algal oils, as shown in "Algal oil Sample 1 crude" algal oil and "Algal oil sample 4 crude" algal oil, have much higher concentrations of the Maillard reaction products than their deodorized counterparts such as "Algal oil sample 2 BWD deo desmet" algal oil, and "Algal oil sample 4 RBWD deo desmet" algal oil, respectively. The concentration the pyrazines is particularly high where the concentrations reach hundreds to thousands of ppb (as ethyl heptanoate). In the deodorized oils, these pyrazines are either not detected or detected at <0.3 ppb (as ethyl heptanoate). The other Maillard reaction products are also at significantly higher concentrations in the crude algal oils (in the 10 to 100 ppb range), whereas they are not detected in most of the deodorized oils.

The deodorized algal oils show much smaller peaks for most compounds compared to the crude algal oils, with many of the Maillard reaction products no longer detected after deodorization. Within the deodorized algal oil samples, the use of VTA deodorization ("Algal oil sample 1 RBWD deo VTA") shows even more improvement with fewer Maillard reaction product peaks detected and lower levels of some lipid oxidation products compared to the Desmet deodorization ("Algal oil sample 1 RBWD deo desmet"). Based on this data, as fewer of the target volatiles are detected, the palatability rating tends to improve (increase).

The lipid oxidation products were detected at lower concentrations in the deodorized oils compared to the crude oils, but the overall concentration range of the lipid oxidation products was relatively low (<0.3 ppb to about 20 ppb range) and most were not fully removed by deodorization. The peak area of the above-mentioned volatiles for each sample were measured under the condition described above.

The odor impact of each volatile depends not only on its concentration but also on the odor threshold which varies for each compound. Therefore, to judge odor improvement, one should consider the changes in relative peak size for each compound and how that relates to the palatability results. From this data it was observed that the deodorization has a drastic effect in reducing the relatively high concentration Maillard Reaction Products by factors of 100-1000 down to barely detectable levels, corresponding to a more drastic effect on the palatability results. Deodorized samples show that further reductions in the Maillard Reaction Products demonstrate a corresponding improvement in the palatability result, even when similar levels of the lipid oxidation products are present (i.e., comparing sample "Algal oil sample 1 RBWD deo desmet" to sample "Algal oil sample 1 RBWD deo VTA" or comparing sample "Algal oil sample 1 BWD deo desmet" to "Algal oil sample 2 BWD deo desmet").

Sample "Fish oil Sample 3" is the control for "Fish oil Sample 3 RBWD". Both fish oil samples have been deodorized and thus were low in Maillard Reaction Products. However, sample "Fish oil Sample 3 RBWD" was deodorized using a VTA deodorizer and thus has even lower concentration of Maillard Reaction Products. Sample "Fish oil Sample 3 RBWD" showed an improved palatability score over an already deodorized "Fish oil Sample 3" when a VTA deodorizer was used.

Sample "Algal oil sample 4 crude" is the control for "Algal oil sample 4 crude" in the two-bowl test. "Algal oil sample 4 crude" is another batch of crude algal oil which once again showed it was high in Maillard Reaction Products. After the crude algal oil is processed with refinement, bleach, winterization and deodorization steps, it was low in Maillard Reaction Products and thus has improve palatability over the control sample.

TABLE 5

| compound | | 1-penten-3-one | 4-heptenal | 2,6-nonadienal | trimethyl-pyrazine | 2-ethyl-3,5-dimethyl pyrazine | 2-ethyl-3,6-dimethyl pyrazine | tetramethyl pyrazine | 2-hydroxy-3-methyl-2-cyclopenten-1-one | methyl-1H-pyrrole-2-carboxal-dehyde | indole | Palatability |
|---|---|---|---|---|---|---|---|---|---|---|---|---|
| ion m/z>> | | 84 | 84 | 70 | 122 | 135 | 135 | 136 | 112 | 109 | 90 | |
| RT min>> | | 8.1 | 15.1 | 24.3 | 19.6 | 20.7 | 21.1 | 21.4 | 29.4 | 33.3 | 37.3 | |
| sample type | filename | | | | | | | | | | | |
| Algal oil sample 1 RBWD deo VTA | average | 1 | 0.5 | nd | nd | nd | nd | nd | nd | nd | nd | 82.8 |
| | stdev | 0.0 | 0.0 | nd | nd | nd | nd | nd | nd | nd | nd | |
| Algal oil sample 1 RBWD deo desmet | average | 2 | 0.4 | <0.1 ppb | <0.1 ppb | nd | nd | nd | nd | nd | nd | 74.6 |
| | stdev | 0.2 | 0.0 | 0.0 | 0.0 | nd | nd | nd | nd | nd | nd | |
| Algal oil sample 1 BWD deo desmet | average | 12 | 0.4 | 0.3 | <0.1 ppb | nd | nd | nd | nd | nd | nd | 74.3 |
| | stdev | 1 | 0.0 | 0.0 | 0.0 | nd | nd | nd | nd | nd | nd | |
| Algal oil sample 2 BWD deo desmet | average | 10 | 1 | 0.3 | <0.1 ppb | <0.1 ppb | <0.1 ppb | nd | nd | <0.1 ppb | nd | 58.3 |
| | stdev | 0.4 | 0.0 | 0.0 | 0.0 | 0.0 | 0.0 | nd | nd | 0.0 | nd | 56.9 |
| Algal oil sample 1 crude | average | 1 | 1 | 3 | 2194 | 1055 | 349 | 212 | 120 | 13 | 7 | 19.4 |
| | stdev | 0.0 | 0.1 | 0.1 | 8 | 1 | 2 | 0.0 | 3 | 0.0 | 0.8 | |
| RC fish oil (control oil) | average | 1.8 | 0.4 | 0.2 | <0.1 ppb | 0.1 | <0.1 ppb | <0.1 ppb | nd | <0.1 ppb | 0.3 | N/A |
| | stdev | 0.2 | 0.0 | 0.0 | 0.1 | 0.0 | 0.0 | 0.0 | nd | 0.0 | 0.0 | |
| Fish oil sample 3 RBWD | average | 1.4 | <0.1 ppb | <0.1 ppb | <0.1 ppb | nd | nd | nd | nd | nd | nd | 76.9 |
| | stdev | 0.0 | 0.0 | 0.0 | 0.0 | nd | nd | nd | nd | nd | nd | 75.6 |

TABLE 5-continued

| Sample | | | | | | | | | | | | |
|---|---|---|---|---|---|---|---|---|---|---|---|---|
| Fish oil sample 3 (control oil) | average | 20 | 11 | 19 | 0.4 | 0.3 | 0.1 | <0.1 ppb | nd | <0.1 ppb | 5 | N/A |
| | stdev | 2 | 1 | 0 | 0.1 | 0.0 | 0.0 | 0.0 | nd | 0.0 | 0.3 | |
| Algal oil sample 4 RBWD deo desmet | average | 1.2 | 0.3 | 0.1 | 0.3 | 0.1 | <0.1 ppb | nd | nd | nd | nd | 64.6 |
| | stdev | 0.1 | 0.0 | 0.0 | 0.0 | 0.0 | 0.0 | nd | nd | nd | nd | 58.8 |
| Algal oil sample 4 crude | average | 3 | 2 | 8 | 3932 | 2992 | 632 | 312 | 49 | 15 | 131 | NA |
| | stdev | 0.1 | 0.2 | 1 | 375 | 241 | 51 | 29 | 7 | 4 | 55 | | nd = not detected
Limit of Detection ~ < 0.01 ppb ethyl heptanoate
Limit of Quantitation ~ < 0.1 ppb ethyl heptanoate
Concentration = ppb quantified as ethyl heptanoate Example 6

Human Sensory Evaluation of Refined Algal PUFA Oil Samples

In order to identify the human sensory perception of algal PUFA oils which have been either deodorized or not deodorized, descriptive sensory profiles of such oils were obtained and measured.

The "1099 crude" is an unprocessed crude algal oil which was extracted from *Schizochytrium* strain ATCC PTA-10208. It was used as the starting oil for refinement, bleaching, chill-filtering and deodorization. "RC fish oil" as mentioned in Example 3 was used for the control oil in the two-bowl palatability test.

The "1099 Refined" sample refers to the ensuing oil after the crude algal oil sample "1099 crude" was refined, but not bleached, winterized or deodorized.

The "1099 Bleached" sample refers to the ensuing oil after the crude algal oil sample "1099 crude" was bleached, but not refined, winterized or deodorized.

The "1099A Chill-filtered" sample refers to the ensuing oil after the crude algal oil sample "1099 crude" was bill filtered 7° C., but not refined, bleached, winterized or deodorized.

The "1099B Chill-filtered" sample refers to the ensuing oil after the crude algal oil sample "1099 crude" was bill filtered 19° C., but not refined, bleached, winterized or deodorized.

The "1099A Deod" sample refers to the ensuing oil after the crude algal oil sample "1099 crude" was deodorized by a VTA deodorizer and refined, bleached, and winterized at 7° C.

The "1099B Deod" sample refers to the ensuing oil after the crude algal oil sample "1099 crude" was deodorized by a VTA deodorizer and refined, bleached, and winterized at 19° C.

A number of human sensory properties were examined and measured, including the offensive flavors of: burnt, fishy complex, green complex, meat protein, putrid, chemical/Solvent, malty/grainy, egg complex, skunk, cocoa, and painty. The corresponding palatability tests on each of the above five oil samples were also conducted, with "RC fish oil" as the reference diet.

The result of the experiment is shown in FIG. 1.

The deodorized algal oil shows the least intensity of offensive flavor. In comparison, the undeodorized algal oils all have shown at least five folds or even higher intensity of offensive flavor. Such difference reversely correlates with the palatability scores of deodorized algal oil and algal oils which were not deodorized. In other words, deodorized oil has high palatability score and has low intensity of offensive flavor than algal oils which were not deodorized. The algal oils which were not deodorized all have low palatability score and high intensity of offensive flavor.

What is claimed is:

1. A method for enhancing palatability of a polyunsaturated fatty acid (PUFA) oil product to a human or companion animal comprising the steps of:
   (a) obtaining a crude PUFA oil;
   (b) degumming and/or refining the crude PUFA oil obtained in step (a) by feeding the crude PUFA oil through a short path evaporator (SPE) to obtain a degummed and/or refined PUFA oil; and
   (c) deodorizing the degummed and/or refined PUFA oil obtained from the degumming and/or refining step (b) to obtain a deodorized PUFA oil; wherein
   the yield of the deodorized PUFA oil after the deodorizing step (c) is no less than 85% of the crude PUFA oil started with at the step (a), and wherein
   the deodorized PUFA oil after the deodorizing step (c) has a palatability score as measured by an animal food preference test which is at least 10 percentage points higher than the palatability score of the crude PUFA oil started with at the step (a).

2. The method of claim 1, wherein the yield of the deodorized PUFA oil obtained after the deodorizing step (c) is no less than 90% of the crude PUFA oil started with at the step (a).

3. The method of claim 2, wherein said animal food preference test is a two-bowl test.

4. The method of claim 3, wherein the palatability score of the deodorized PUFA oil obtained after the deodorizing step (c) is at least 20 percentage points higher than the palatability score of the crude PUFA oil started with at the step (a).

5. The method of claim 3, wherein the palatability score of the deodorized PUFA oil obtained after the deodorizing step (c) is at least 30 percentage points higher than the palatability score of the crude PUFA oil started with at the step (a).

6. The method of claim 3, wherein the palatability score of the deodorized PUFA oil obtained after the deodorizing step (c) is at least 40 percentage points higher than the palatability score of the crude PUFA oil started with at the step (a).

7. The method of claim 3, wherein the palatability score of the deodorized PUFA oil obtained after the deodorizing step (c) is at least 45 percentage points higher than the palatability score of the crude PUFA oil started with at the step (a).

8. The method of claim 7, wherein the deodorizing step (c) is conducted using a deodorizer.

9. The method of claim 8, wherein the crude PUFA oil is derived from fish.

10. The method of claim 8, wherein the crude PUFA oil is derived from microorganisms.

11. The method of claim 10, wherein the microorganisms are algae.

12. The method of claim 11, wherein the algae are *Schizochytrium, Aurantiochytrium*, or *Thraustochytrium*.

13. The method of claim 8, wherein the crude PUFA oil is derived from plants.

14. The method of claim 13, wherein the crude PUFA oil comprises at least one esterified fatty acid selected from the group consisting of docosahexaenoic acid (DHA), eicosapentaenoic acid (EPA), arachidonic acid (ARA) and docosapentaenoic acid (DPA).

\* \* \* \* \*